Patented Aug. 3, 1943

2,325,797

UNITED STATES PATENT OFFICE 2,325,797

MANUFACTURE OF 3-NITRO-4-AMINO ANISOL

Roy A. Pizzarello, Mount Vernon, N. Y., assignor to Interchemical Corporation, New York, N. Y., a corporation of Ohio No Drawing. Application October 21, 1941, Serial No. 415,949

3 Claims. (Cl. 260—562)

This invention is concerned with an improvement in the known methods of producing 3-nitro-4-amino anisol, and is directed particularly to an improvement in aqueous nitration procedures whereby substantially improved yields are obtained of products which are much easier to purify as compared with conventional methods.

3-nitro-4-amino anisol is an important intermediate in dyestuff manufacturing. It was first prepared in 1891 by H. Hahle (Jour. fur Praktische Chemie, Neue Folge 43, 62, 1891), who heated 3-nitro-4-amino phenol with tetramethylammonium hydroxide and obtained a brown syrup from which he was able to isolate 3-nitro-4-amino anisol. In the same year, Autenrieth and Hinsberg (Archiv der Pharmazie, 456–67, 1891) prepared 3-nitro-4-amino phenetol by treating para-acetylamino phenetol with boiling 11% nitric acid. This method was repeated successfully by Medola and Eyre (Journal Chemical Society, 81, 991, 1902). F. Reverdin adapted this method to 3-nitro-4-amino anisol (Berichte der Deutschen Gesellschaft, 29, 2595, 1896); he obtained a 60–70% yield of a product which he purified with some difficulty.

Thereafter, Reverdin and his associates continued their studies, but dropped the aqueous nitration for nitration in glacial acetic acid (Berichte der Deutschen Gesellschaft, 40, 2848, 1907, 42, 1525, 1909, 43, 3461, 1910, 45, 349, 1912), using para anisidine and other para-amino phenol ethers, blocking the amino group by producing the acetyl or toluolsulfonyl derivative. Yields obtained are not substantially higher than in the original aqueous nitration method suggested by Autenrieth and Hinsberg, but the desired products can be recovered more readily.

I have discovered that substantially increased yields of 3-nitro-4-amino anisol can be obtained, in a form which permits of easy purification, by nitrating the blocked para-amino-substituted anisol in an aqueous medium with moderately dilute nitric acid, provided the reaction be conducted at relatively low temperatures.

In my process, I use moderately dilute nitric acid (20% to 25% strength) in amount between about 1½ and about 2 mols, to effect the nitration at ordinary room temperatures, without an external source of heat. The exothermic reaction is allowed to proceed for a maximum of 30–40 minutes and a maximum rise in temperature to about 65° C.; when the reaction is completed, sufficient cold water is added to reduce the temperature back to room temperature (ca 25° C.) This method has the marked advantage of producing high yields of a technical product directly, without any purification.

Thus, I prepared 4-acetylamino anisol from para-anisidine in conventional fashion. I then prepared the nitro-derivative as follows:

*3-nitro-4-acetylamino anisol.*—165 parts of para-acetanisidine are added at room temperature to 705 parts of 20% nitric acid solution (185 parts 42° Bé. acid plus 520 parts water). The mixture is vigorously stirred and within a few minutes nitration begins, for the characteristic yellow nitro body, together with a rise in temperature as observed. Within a period of five minutes the mixture thickens and the temperature reaches about 40° C. After 10–15 minutes more, the maximum temperature is reached. This approximates 60° C. At this time an additional 520 parts of water are added and the mix stirred until the temperature falls to 25° C. The precipitated nitro-acetyl-amino-anisol is filtered, washed acid-free with water, and dried at 60–70° C. The golden yellow needles of 3-nitro-4-acetylamino anisol weigh 169 parts. This represents a yield of 80%. The product as obtained from these procedures is in a pure state. The material without any purification melts at 115–117° C. and contains 13.46% $N_2$. Pure 3-nitro-4-acetylamino anisol obtained by recrystallization from alcohol melts at 117° C., and contains 13.34% $N_2$.

The free 3-nitro-4-amino anisol is prepared in conventional fashion. For example—

*3-nitro-4-amino anisol.*—The nitro-acetyl body is suspended in 820 parts of alcohol and heated to reflux. 160 parts of sodium hydroxide dissolved in an equal amount of water are then added over a period of twenty minutes, when the orange-red solution turns to deep reddish-brown color. The mix is allowed to reflux an additional ten minutes, when the deep red solution is drowned in 1000 parts of ice-water mixture. It is now stirred for a half-hour and then filtered, washed free of alkali with cold water, and dried at 60°–70° C. The orange-red prismatic crystals weight 119 parts (72%). The material melts at 122–125° C., and contains 16.40% $N_2$. A sample recrystallized from hot water melts at 123–124, C., and contains 16.65% $N_2$ (16.67% theory).

The strength of the acid used is of considerable importance. It must be strong enough to initiate and maintain exothermic reaction without external heat, and yet not so strong as to produce dinitro derivatives. Acid from 20% to 25% represents approximate limits of strength. If lower strength acid is used, the reaction does not proceed well without external heat, and low yields are obtained. Where stronger acid is used, the resulting product is impure, and contains oxidation products and dinitro derivatives which are difficult to separate.

Similarly, if amounts of acid less than 1½ mol per mol of intermediate are used, yields are low; whereas acid in quantity above about 2 mols gives oxidation and dinitration, with consequent impure material.

While I have shown but a single example of my invention, obviously examples can be multiplied without departing from the scope thereof, as defined in the claims.

I claim:

1. The method of preparing a 3-nitro derivative of a 4-blocked amino substituted anisol in substantially technically pure state in high yield, which comprises bringing substituted anisol into contact with from 1½ to 2 mols of nitric acid diluted with water to a strength of 20 to 25%, allowing the exothermic reaction to proceed without external heat until the maximum temperature obtainable is reached, diluting with further water to cool the solution, and recovering the resultant precipitated product.

2. The method of preparing 3-nitro-4-acetylamino anisol in substantially technically pure state in high yield, which comprises bringing para-acetanisidine into contact with from 1½ to 2 mols of nitric acid diluted with water to a strength of 20 to 25%, allowing the exothermic reaction to proceed without external heat until the maximum temperature obtainable is reached, diluting with further water to cool the solution, and recovering the resultant precipitated product.

3. The method of preparing 3-nitro-4-acetylamino anisol in substantially technically pure state in high yield, which comprises bringing para-acetanisidine into contact with a cool 20% nitric acid solution containing about 2 mols of nitric acid per mol of para-acetanisidine, allowing the exothermic reaction to proceed for about one half hour until a maximum temperature of about 60° C. is reached, diluting with further water to cool the solution, and recovering the resultant precipitated product.

ROY A. PIZZARELLO.